US011542188B2

United States Patent
Salinas et al.

(10) Patent No.: US 11,542,188 B2
(45) Date of Patent: Jan. 3, 2023

(54) CONTINUOUS GLASS MELTING TANK WITH AN IMMERSED STIRRING BODY

(71) Applicant: ABB Schweiz AG, Baden (CH)

(72) Inventors: Ener Salinas, Västerås (SE); Xiaojing Zhang, Västerås (SE); Hongliang Yang, Västerås (SE); Göran Eriksson, Västerås (SE); Ulf Sand, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/310,918

(22) PCT Filed: Feb. 21, 2020

(86) PCT No.: PCT/EP2020/054690
§ 371 (c)(1),
(2) Date: Aug. 31, 2021

(87) PCT Pub. No.: WO2020/178051
PCT Pub. Date: Sep. 10, 2020

(65) Prior Publication Data
US 2022/0098077 A1    Mar. 31, 2022

Related U.S. Application Data

(60) Provisional application No. 62/814,111, filed on Mar. 5, 2019.

(51) Int. Cl.
*C03B 5/187*    (2006.01)
*B01F 33/452*    (2022.01)

(52) U.S. Cl.
CPC ............ *C03B 5/187* (2013.01); *B01F 33/452* (2022.01); *B01F 2215/049* (2013.01); *B01F 2215/0431* (2013.01); *B01F 2215/0477* (2013.01)

(58) Field of Classification Search
CPC .............................. C03B 5/187; B01F 33/452
USPC ...................... 65/135.2, 135.3; 366/273, 274
See application file for complete search history.

(56) References Cited

U.S. PATENT DOCUMENTS

| | | | | |
|---|---|---|---|---|
| 2,198,304 A | * | 4/1940 | Cornelius | H05B 6/34 65/182.3 |
| 2,382,187 A | * | 8/1945 | Vang | C03B 25/00 264/108 |
| 2,518,758 A | * | 8/1950 | Cook | B01F 33/452 203/99 |
| 3,749,369 A | * | 7/1973 | Landsberger | B01F 33/452 422/224 |

(Continued)

FOREIGN PATENT DOCUMENTS

| | | |
|---|---|---|
| CA | 1230733 A1 | 12/1987 |
| CN | 102575376 A | 7/2012 |

(Continued)

OTHER PUBLICATIONS

Chinese Search Report; Application No. 2020800186413; dated Jan. 14, 2022; 4 Pages.

(Continued)

*Primary Examiner* — David L Sorkin
(74) *Attorney, Agent, or Firm* — Whitmyer IP Group LLC

(57) ABSTRACT

A glass furnace for continuous operation, including a melting tank for containing a glass melt, and at least one magnetic actuator configured to generate a time-varying magnetic field suitable for moving a stirring body immersed in the glass melt.

21 Claims, 4 Drawing Sheets

(56) References Cited

U.S. PATENT DOCUMENTS

| | | | | |
|---|---|---|---|---|
| 3,774,885 | A | * | 11/1973 | Logvinenko ............... B29B 7/74 |
| | | | | 252/62.51 R |
| 4,568,192 | A | * | 2/1986 | Kudermann .......... B01F 33/452 |
| | | | | 422/78 |
| 4,743,302 | A | * | 5/1988 | Dumesnil ................ C03C 8/245 |
| | | | | 501/15 |
| 4,862,477 | A | | 8/1989 | Olds et al. |
| 2005/0252243 | A1 | * | 11/2005 | Kunert ....................... C03B 7/02 |
| | | | | 65/122 |
| 2016/0008779 | A1 | * | 1/2016 | Seaward ............. B01F 33/5012 |
| | | | | 366/273 |

FOREIGN PATENT DOCUMENTS

| | | |
|---|---|---|
| CN | 105236710 A | 1/2016 |
| CN | 108726850 A | 11/2018 |
| DE | 102008011048 A1 | 9/2009 |
| GB | 1289317 A | 9/1972 |
| JP | H01164736 A | 6/1989 |
| JP | H02107531 A | 4/1990 |
| JP | H09309731 A | 12/1997 |
| JP | 2992634 B1 | 12/1999 |
| WO | 9718415 A1 | 5/1997 |
| WO | 2007065937 A1 | 6/2007 |
| WO | 2009106056 A1 | 9/2009 |
| WO | 2009106057 A1 | 9/2009 |
| WO | 2009106058 A2 | 9/2009 |
| WO | 2015058833 A1 | 4/2015 |

OTHER PUBLICATIONS

Nalewaj, Krzysztof; "The Possibility Of Applying A Magnetic Stirrer To Stirring Molten Glass"; Modelling, Simulation and Control; BAMSE Press, vol. 30, No. 2, 1990; 6 Pages.

International Preliminary Report on Patentability; Application No. PCT/EP2020/054690; dated Jun. 23, 2021; 13 Pages.

\* cited by examiner

CONTINUOUS GLASS MELTING TANK WITH AN IMMERSED STIRRING BODY

TECHNICAL FIELD

The present disclosure relates to the field of glass furnaces. It proposes a glass melting tank with circulation means for accelerating the homogenization of the melt.

BACKGROUND

Glass melting is an energy- and capital-intensive process. The melting energy needed to convert mixed raw material (bulk) into fully molten and refined glass ranges from 0.6 to 1 MWh/ton. Today's glass furnaces operate with a thermal efficiency around 45%, so that, in other words, more energy is released into the environment than is used to convert the raw materials to molten glass. Further, a typical fuel-fired floating glass furnace has a lifetime of about 5 to 15 years. With such limited lifetime, the average time for which the glass melt must be retained in the furnace, 5 to 10 hours, is relatively long and not satisfactory from a productivity point of view. If the thermal efficiency of the process can be improved and/or the retention time can be reduced, considerable savings will ensue.

With regard to the retention time, the state of the art includes various attempts to homogenize the glass melt at a faster pace. Such attempts include electromagnetic stirring (EMS) technology by means of externally applied Lorentz forces. While solid silicate-type glass like its raw materials (batch) are dielectric in solid form, with a resistance of about 1011 to 1013 $\Omega \times m$, a glass melt at 1500° C. is weakly electrically conductive due to the presence of mobile ions, such as $Na^+$ and $K^+$. The resistivity of the glass melt may vary from 0.001 to 0.1 $\Omega \times m$ depending on the temperature and the concentration of alkali metal oxides ($Na_2O$, $K_2O$) and divalent metal oxides (PbO, CaO, BaO, MgO). This weak conductivity is sufficient to allow satisfactory EMS in small, electrically heated glass melt crucibles. However, since the glass melt is relatively resistive—with a resistivity about $10^4$ times that of molten iron—the EMS produces significant excess heat.

An alternative prior art approach, so-called melting boosting, is suitable for larger fuel-heated furnaces as well. It includes heating the glass melt locally using vertical electrodes. Such heating is normally localized to regions far from the main heat source and/or where it may stimulate thermal convection efficiently.

An interesting problem is to reduce the average retention time in a glass furnace (of any industrially applicable size) by improving the flow circulation. Another desirable aim is to reduce the statistical variation of the retention time in a continuous glass furnace, which would then allow an increase of the flow speed without jeopardizing the quality of the final product.

SUMMARY

One objective is to make available a glass furnace with reduced retention time, an arrangement for reducing the retention time of a glass furnace, and a method for operating a glass furnace. A particular objective is to improve the circulation in a melting tank of the glass furnace, so that a homogenous melt is obtained in shorter time. The invention according to the independent claims addresses these and other objectives.

In a first aspect of the invention, there is provided a magnetic stirring arrangement for a glass furnace suitable for continuous operation. The furnace comprises a melting tank for containing a glass melt. In one embodiment, the magnetic stirring arrangement comprises an electrically conductive stirring body to be immersed in the glass melt and a magnetic actuator configured to generate a time-varying magnetic field suitable for moving the stirring body.

The stirring body or bodies accelerate the chemical and/or thermal homogenization of the glass melt compared to natural convection and diffusion, which are slow processes due to the glass melt's high viscosity of about 5 Pa×s. An immersed body at moderate distance into the glass melt can be actuated magnetically, since a magnetic field is able to penetrate the weakly conductive glass melt. Stirring by means of an immersed solid object may be more energy-efficient than EMS acting by Lorentz force on the glass melt itself and may also be applicable to larger melting tanks.

In embodiments, the magnetic actuator or actuators may be arranged beneath a floor of the melting tank, in particular a small distance beneath the floor. This way, the resulting magnetic field is suitable for moving a stirring body which is supported by the floor, e.g., by touching, resting on or repeatedly bouncing on the floor during the rotation which is brought about by the magnetic field. This may limit the attenuation of the magnetic field by the glass melt. It may also render it easier to retain the stirring body against the flow of the glass melt. In particular, the magnetic actuator may be configured to retain the stirring body axially to avoid that the body is entrained by the flow of the melt. For example, the magnetic field or its variation may be designed to include a downward component or an axially reverse component with respect to the flow of the melt.

It may be suitable to arrange the magnetic actuator or actuators in a heated section of the melting tank, which is typically a combustion chamber of the glass furnace. By the forced circulation that the stirring bodies achieve, the heating will be more efficient.

In a second aspect of the invention, there is provided a glass furnace suitable for continuous operation. The furnace comprises a melting tank for containing a glass melt and a magnetic actuator configured to generate a time-varying magnetic field suitable for moving a stirring body which is immersed in the glass melt.

In a third aspect of the invention, there is provided a method of continuously operating a glass furnace with a melting tank that contains a glass melt. The method comprises feeding batch material into the glass melt and allowing the glass melt with the batch material to flow into a heated combustion chamber. Batch material may refer to the raw materials of the glass, typically in powdered, particulate or granular form, which are molten by being introduced into the melt. The inhomogeneous mixture of glass melt and freshly added batch material is heated gradually in the combustion chamber. In an embodiment, the method further comprises generating a time-varying magnetic field which is suitable for moving a stirring body immersed in the glass melt.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

Like numbers refer to like elements throughout the description.

DETAILED DESCRIPTION

The aspects of the present disclosure will now be described more fully with reference to the accompanying drawings, in which certain embodiments of the invention are shown. These aspects may, however, be embodied in many different forms. The described embodiments should not be construed as limiting but are rather provided by way of example so that this disclosure will be thorough and complete, and to fully convey the scope of all aspects of invention to those skilled in the art.

Figure 1:
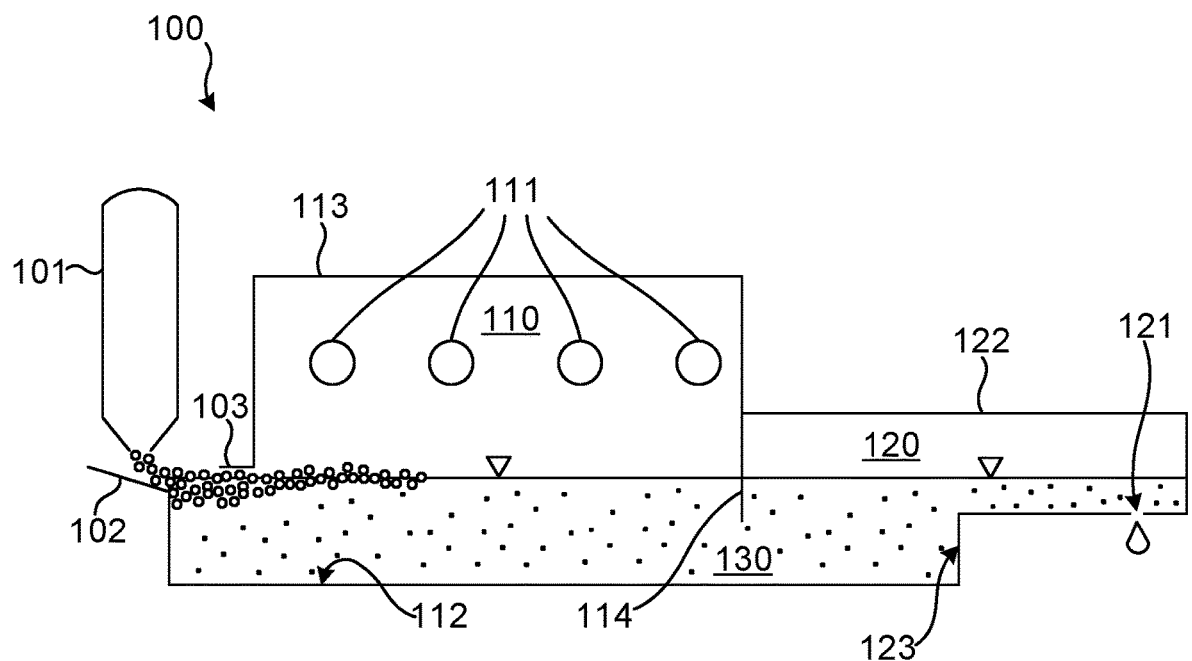
FIG. 1 is an axial section of a glass furnace.

FIG. 1 is an axial section of a glass furnace 100 with a melting tank 112 for receiving a glass melt 130. The melting tank 112 extends axially from a batch feeding zone, through a combustion chamber 110 (first portion of the melting tank 112) and into a feeder chamber 120 (second portion of the melting tank 112) connecting to the downstream end thereof. An example melting tank 112 is 14 m long and 15 m wide. The glass furnace 100 may be adapted for a floating glass process, e.g., for thick glass plate production.

The glass raw materials, collectively referred to herein as batch, may include silica sand, limestone (calcium carbonate), soda ash (sodium carbonate), dolomite and other chemicals. A batch silo 101 is operable to release powdered, particulate or granulated batch material onto a chute 102, from which it is guided under a cover 103 into the glass melt 130 in the melting tank 112. The batch silo 101 and chute 102 form a batch feeding arrangement. The rate at which the batch material can be fed into the glass melt 130 depends, among other factors, on the heating capacity of the combustion chamber 110 and the speed of circulation in the glass melt.

In the combustion chamber 110, which is delimited by a superstructure 113 including a refractory crown and lateral walls, there is arranged a set of burner ports 111. In a glass furnace 100 of the cross-fired regenerative type, each of the left and the right lateral walls of the combustion chamber 110 has one set of burner ports 111. In a first mode of operation, flames or hot air enters the combustion chamber 110 from the left wall burner ports 111 and is evacuated via orifices on the right wall, from which the hot air is channeled to right-side regenerators (not shown) and then towards a flue-gas chimney (not shown). The regenerators are designed to absorb and store thermal energy; they may comprise checkers or refractory bricks stacked in a regenerator chamber. The first mode of operation is alternated with a second mode, in which the hot air enters from the right wall burner ports 111 and is evacuated from the combustion chamber 110 through the left wall to left-side regenerators (not shown). The hot air has been preheated during its passage through the right-side regenerators and is additionally heated by the burning of gaseous or dispersed liquid or solid fuel before entry into the combustion chamber 110. The reversal of the air flow, i.e., the alternation between the first and second modes of operation may, be undertaken every 20-30 minutes.

The invention is also applicable to end port-fired (or U-flame) regenerative glass furnaces, in which the burner ports are arranged at the back (i.e., upstream) wall of the superstructure. The combustion of fuel mixed with preheated air takes place from one set of burners on the back wall and flames may extend over the length of the furnace. The combustion gases turn around at the front (i.e., downstream, or shadow) wall of the superstructure and are evacuated through a set of orifices on the back wall. The reversal of the air flow may be performed in the same manner as in a cross-fired regenerative furnace.

The shadow wall, meaning the downstream wall (to the right in FIG. 1) of the superstructure 113, has a submerged portion referred to as a bridge wall 114. This separates the combustion chamber 110 from the feeder chamber 120 thermally and physically. The thermal separation serves to concentrate the supplied heating power to the combustion chamber 110. Furthermore, any floating unmolten batch material is stopped from entering the feeder chamber 120 through the throat defined by the bridge wall 114 and the floor of the melting tank 112. The feeder chamber 120, which is enclosed in a housing 122, includes a spout 121 for extracting ready glass melt for further processing. The spout 121 is preferably located downstream of a riser 123, in a shallower end section of the melting tank 112. To maintain the glass melt in the feeder chamber 120 at an even temperature suitable for the subsequent processing, an arrangement of (central) cooling elements and (lateral) heating elements may be provided, in a per se known manner.

Figure 2:
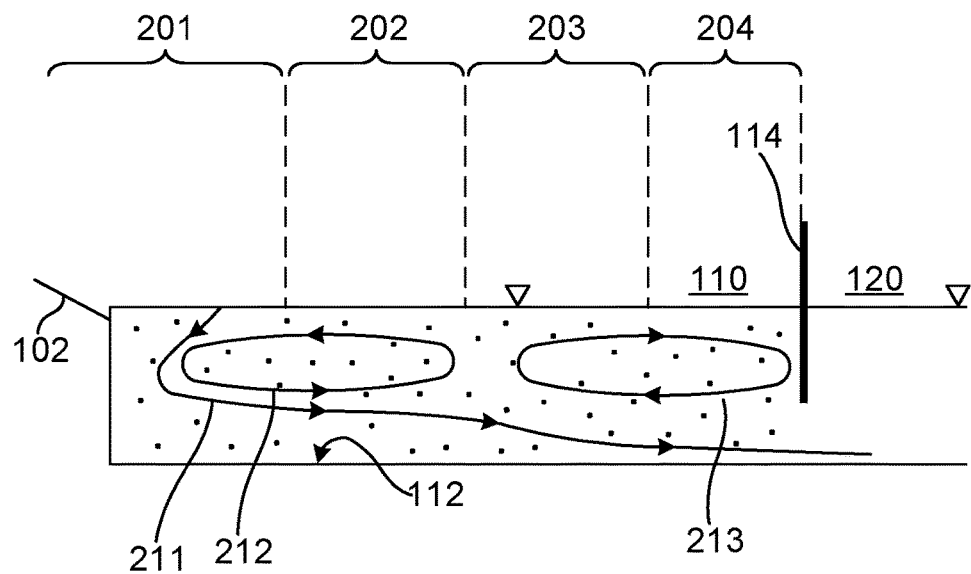
FIGS. 2 and 3 are axial sections of an upstream portion of the glass furnace of FIG. 1, in which two possible flow patterns of the glass melt are suggested by flow lines.
Figure 3:
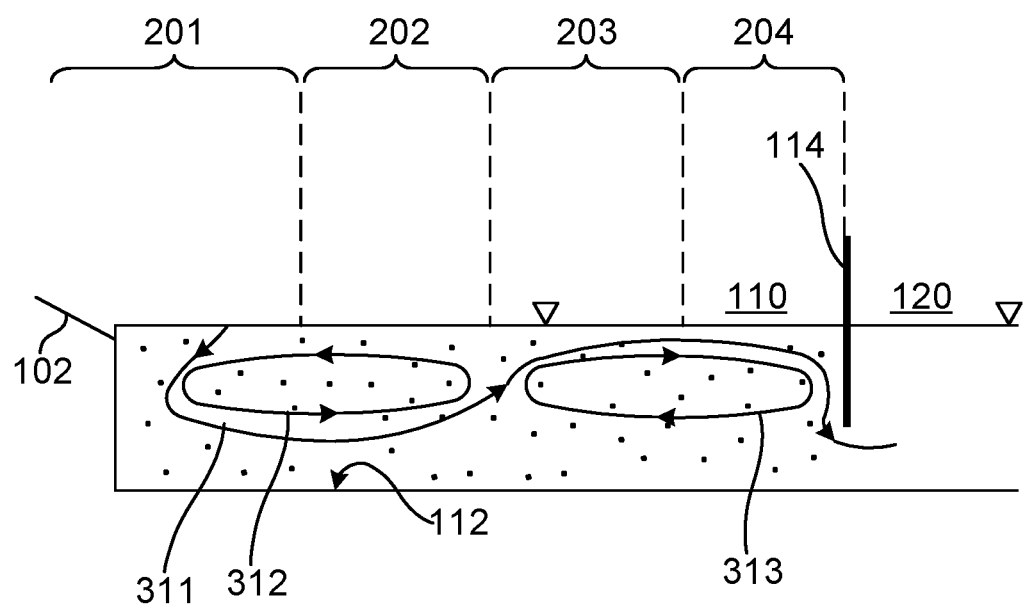

The flow behavior of the glass melt 130 may be better understood with reference to FIGS. 2 and 3, which are axial sections of the upstream portion of the glass furnace of FIG. 1, approximately between the chute 102 and the bridge wall 114. FIG. 2 includes flow lines of a first expected flow pattern, which has been observed and confirmed by simulations. The flow lines include a linear trajectory 211 and two convective loops 212, 213, which represent example paths that a particle traveling with the glass melt may trace. A typical flow speed may be 0.2 cm/s. Because different particles entering the glass melt upstream in substantially identical manner may either travel straight to the throat below the bridge wall 114 or participate in the thermal convection loops 212, 213 before leaving the combustion chamber 110, the statistical variation of the retention time will be non-negligible.

The glass pull (capacity) of the glass furnace may be in the range from 20 to 700 metric tons per day. The glass pull, which is related to the flow speed, may be limited by the statistical variation of the retention time. More precisely, if the glass melt was brought to flow faster, for example, the output may contain undesired components, such as grains of unmolten batch. This underscores the importance of efficient circulation.

The glassmaking is a continuous, nonequilibrium process with successive stages that correspond to four zones which can be discerned in the melting tank 112:

- A batch blanket zone 201, in which freshly added, still unmolten batch material substantially covers the surface of the glass melt. A well-dosed amount of batch will melt in about 40-60 minutes. Bubbles form during the melting at the interfaces of batch particles. Additional air may be entrained by sinking batch material. The bubbles may reinforce the natural convection to some extent, as they tend to lift the cooler glass melt.
- A foam zone 202, where foam substantially covers the surface of the glass melt as a result of the bubble-forming during melting and of degassing of the glass melt. Intense radiative heating in the foam zone 202 is not meaningful as the foam acts as thermal insulator.
- A hot spot zone 203, to which the applied heating power is concentrated approximately. The convective flow is generally upward in the hot spot zone 203. Circulation may be improved by forcing the cooler glass melt near the floor to move upwards. For this purpose, an optional weir, cross wall or shelf (not shown) may be provided in the hot spot zone 203 or directly downstream thereof.
- A refining (or fining) zone 204, for further degassing and homogenization of the glass melt.

The four zones 201, 202, 203, 204 are consecutive with respect to the net flow direction of the glass melt. Individual particles traveling with the glass melt flow pattern, such as particles engaging in the convective loops 212, 213, may however enter the same zone two or more times before continuing its journey.

FIG. 3 shows the same upstream portion of the glass furnace of FIG. 1 annotated with a second expected flow pattern for which empirical evidence exists. The second expected flow pattern includes a trajectory 311 which is tangential to a lower side of an upstream convective loop 312 and to an upper side of a downstream convective loop 313. Further possible flow patterns may exist. Factors that influence the predominant flow pattern in a glass furnace 100 include the dimensions and geometry of the melting tank 112, the magnitude and location of the supplied heating power, the viscosity of the glass melt, as well as the particle size distribution and density of the batch material.

Figure 7:
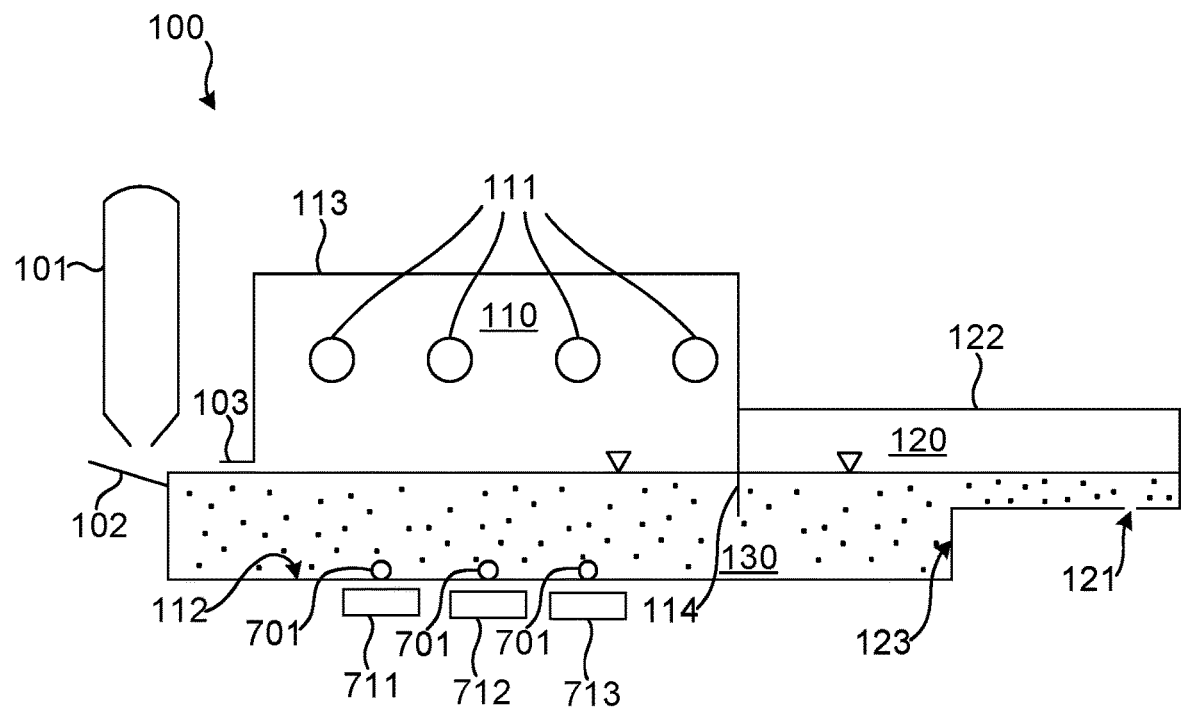
FIG. 7 is an axial section and FIG. 8 is a top view of a glass furnace with six magnetic actuators and corresponding immersed stirring bodies, according to an embodiment of the invention.
Figure 8:
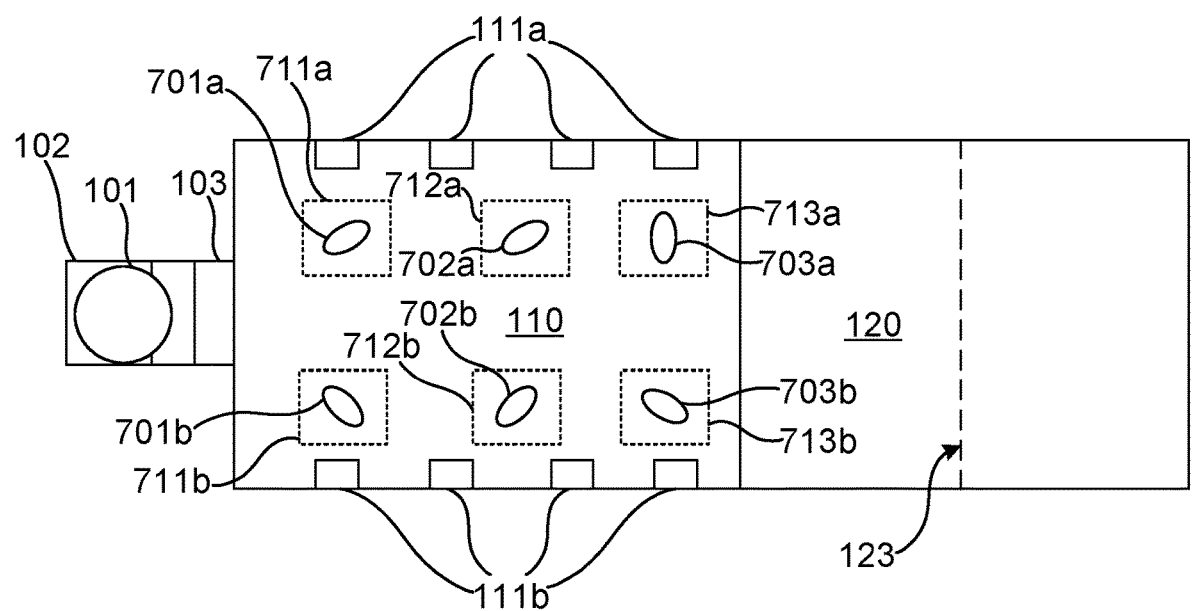

FIG. 7 is an axial section and FIG. 8 is a top view of a glass furnace 100 which, according to an embodiment of the invention, is provided with six magnetic actuators 711*a*, 711*b*, 712*a*, 712*b*, 713*a*, 713*b* configured to generate time-varying magnetic fields and associated immersed stirring bodies 701*a*, 701*b*, 702*a*, 702*b*, 703*a*, 703*b* to be moved by the magnetic fields. An actuator 711*a*, 711*b*, 712*a*, 712*b*, 713*a*, 713*b* and a stirring body 701*a*, 701*b*, 702*a*, 702*b*, 703*a*, 703*b* constitute a magnetic stirring arrangement in the sense of the claims. The magnetic fields penetrate the glass melt but are gradually attenuated since the glass melt has non-zero conductivity. To avoid excessive attenuation, it is preferable to arrange the six magnetic actuators 711*a*, 711*b*, 712*a*, 712*b*, 713*a*, 713*b* at a small distance below the floor of the melting tank 112. The feasible least distance may be defined by structural and thermal considerations, including the need to shield off the hot glass melt and/or to accommodate cooling means for removing excess heat produced by the magnetic actuators 711*a*, 711*b*, 712*a*, 712*b*, 713*a*, 713*b*. The stirring bodies 701*a*, 701*b*, 702*a*, 702*b*, 703*a*, 703*b* may have slightly higher density than the glass melt, to be substantially supported by the floor of the melting tank 112.

The magnetic actuators 711*a*, 711*b*, 712*a*, 712*b*, 713*a*, 713*b* may have a two-dimensional arrangement, such as the matrix-like arrangement with two rows and three columns shown in FIG. 8. This arrangement may be suitable for a melting tank 112 which is 8 m wide, 20 m long and 1 m deep if a rotating speed of 0.5 Hz is used. It may be necessary to arrange three or more rows to cover a wide melting tank 112 and/or to add more columns in view of a larger axial extent of the melting tank 112. The magnetic actuators 711*a*, 711*b*, 712*a*, 712*b*, 713*a*, 713*b* are preferably distributed evenly over the axial extent of the combustion chamber 110. Since the glass melt 130 is expected to leave the combustion chamber 110, via the throat under the bridge wall 114, in a substantially homogenized condition, there is no immediate reason to arrange further magnetic actuators in the feeder chamber 120. This may nevertheless be justified based on thermal considerations, such as the desire to maintain a homogeneous temperature distribution in the glass melt.

Figure 4:
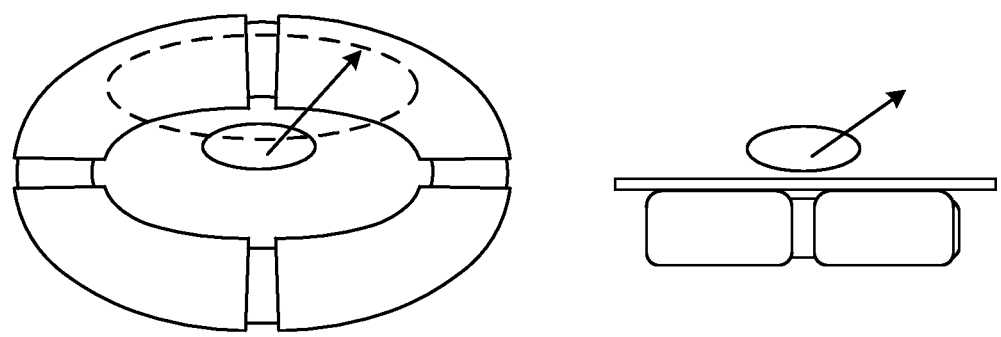
FIG. 4 consists of a perspective view (left) and a side view (right) of a stirring body and an underlying magnetic actuator for use in a glass furnace.

The left portion of FIG. 4 is a perspective view of a set of four magnetic coils, an ellipsoidal stirring body located a small distance above the plane of the coils, an arrow showing a momentary main direction of a time-varying magnetic field and a dashed circle illustrating the time variation of the magnetic field. The four magnetic coils may be mounted on a common circular magnetic yoke. They may be driven by two- or three-phase current. As suggested by the dashed circle, the magnetic field rotates with respect to an axis perpendicular to the plane of the coils; the time variation of magnetic field has a period corresponding to one revolution. The coils are suitable for use in a magnetic actuator in a glass furnace of the type shown in FIGS. 7 and 8, for reasons to be explained next. The magnitude of the generated magnetic field may be of the order of 0.1 T up to 1 T in the region where it reaches the stirring body.

The right portion of FIG. 4 is a side view of the magnetic coils, a floor of a melting tank of the glass furnace, the ellipsoidal stirring body and the momentary main direction of the magnetic field.

Figure 5:
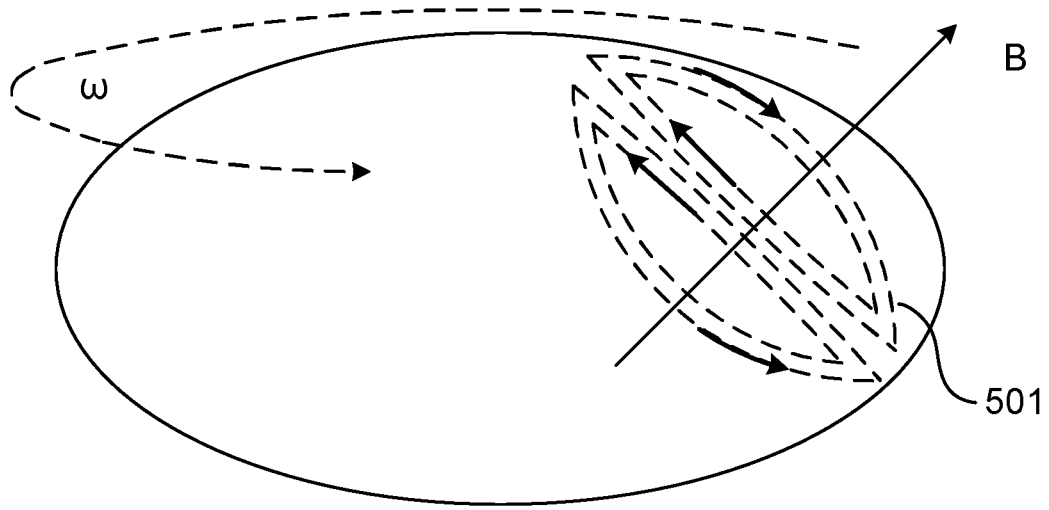
FIG. 5 shows a stirring body exposed to a rotating external magnetic field B, as well as eddy currents induced by the magnetic field.

FIG. 5 shows an ellipsoidal stirring body exposed to a magnetic field B obliquely rotating at angular speed w around an axis (vertical in FIG. 5) forming an angle with the main direction of the magnetic field. The angle may range from 30° up to 90°, such as 45° to 75°, and preferably about 60° as shown in FIG. 5. The angle may be chosen in view of the need to stop the stirring body from moving axially with the glass melt flow. In a configuration where the stirring body is supported by a floor of a melting tank 112, the rotation axis is preferably aligned with the gravitational field.

The stirring body is made of conductive material, and preferably with conductivity significantly higher than that of the glass melt. As a result, and the applied time-varying magnetic field B will tend to induce eddy currents 501. The eddy currents 501 may concentrate in two closed loops substantially orthogonal to the magnetic field B with opposite polarity. According to Lenz's law, the left loop, which corresponds to a region that the external rotating magnetic field B is leaving, will tend to generate a magnetic field that replaces the locally decreasing external field. The right loop, corresponding to a region that the external rotation magnetic field B is entering, will tend to generate a magnetic field that cancels the locally increasing external field. This way, the combined attractive-repulsive action produces a rotating torque oriented in the counter-clockwise direction, so that the stirring body substantially follows the rotation of the external magnetic field B, though usually with a phase lag.

Alternatively, the stirring body may be permanent magnet, such as an object of a suitable ferromagnetic material. If the permanent magnetic field is equivalent, as to magnitude and orientation, to the field induced by the eddy currents 501, such an object will tend to follow the rotation of the external magnetic field B as well.

The period of the magnetic field's time variation (i.e., one revolution) may be of the order of 1 to 10 s. The period may be chosen in view of the dimension of the stirring body to be applied. For example, the angular velocity of the magnetic field may be such that the stirring body has a peak surface velocity between 1 and 10 cm/s. The peak surface velocity is understood to be the surface velocity of the fastest rotating point on the stirring body's surface, i.e., the point with the largest separation from the rotating axis. As mentioned above, the thermal convection is typically slower by one order of magnitude.

Different ones of the magnetic actuators 711a, 711b, 712a, 712b, 713a, 713b may be configured to generate magnetic fields with different time variations. For example, two magnetic actuators may generate magnetic fields with opposite rotations.

Figure 6:
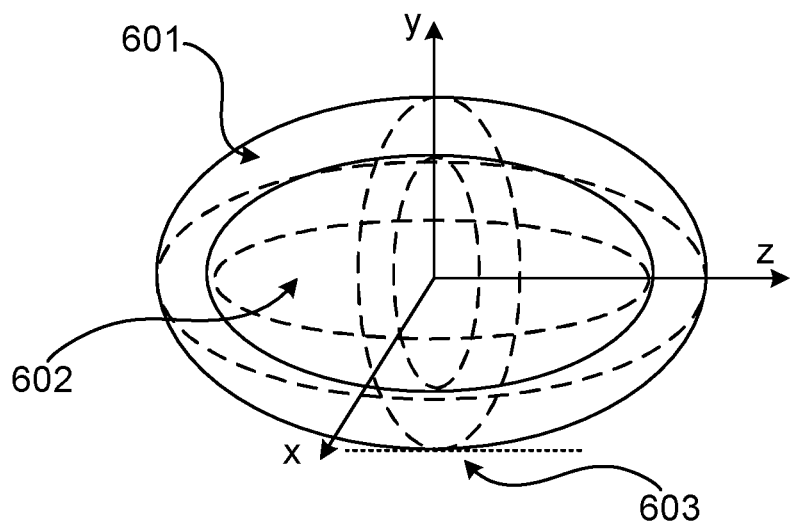
FIG. 6 is a perspective view of an inhomogeneous stirring body.

FIG. 6 shows an example implementation of a stirring body which may be utilized for stirring in a glass furnace 100 equipped with magnetic actuators 711a, 711b, 712a, 712b, 713a, 713b, as shown in FIGS. 7 and 8. The stirring body shown in FIG. 6 is inhomogeneous in that it comprises a shell 601 and a core 602, respectively constituting an external and a central portion of the stirring body. The dashed lines in FIG. 6 indicate an equator and a zero meridian of the shell 601 and, concentric with these, an equator and a zero meridian of the core 602. The stirring body may for example be ellipsoidal with one long and two shorter axes, as shown in FIG. 6, or oval with an eccentric main curvature.

The shell 601 is made of a conductive material, such as a metal, to allow eddy currents to form. Alternatively, as discussed above, the shell 601 may be a permanent magnet. The stirring body stimulates the circulation of the glass melt mainly by being asymmetric with respect to its rotational axis and thereby displacing the glass melt locally in a periodic fashion. An additional circulation-forcing action may be obtained if the outer surface of the shell 601 is such as to exert significant shear forces on the glass melt, in particular, by friction. This has to be balanced, however, against the desirability of low friction against the floor of the melting tank 112 during rotation and further against the need to avoid entrainment by the glass melt. To limit friction against the floor, the stirring body preferably has an even, smooth surface susceptible of resting on a flat surface at a single, small contact point 603. For this purpose, a millimeter-size protrusion may be provided at the bottom center of the stirring body.

The core 602 may be made of a refractory material, such as fire clay, chromite or zirconia. Alternatively, the core 602 is hollow, either evacuated at room temperature (to avoid excessive pressure when the stirring body is heated) or filled with a suitable (e.g., inert) gas or liquid. The option of a core 602 made of a lighter or heavier material than the shell 601 can be utilized to give the stirring body a suitable total density. If the core 602 is significantly less conductive than the core 601, the rotating torque may be more distinct. The total density may be chosen slightly higher than that of the glass melt (i.e., about 3000 kg/m$^3$), to prevent entrainment, but not so high that friction against the floor of the melting tank 112 opposes the rotation significantly. The buoyancy on a comparatively light stirring body may reduce the upward contact forces from the floor. A weight reduction of the stirring body also reduces its moment of inertia, which may be desirable in some circumstances.

The unit formed by the shell 601 and core 602 shall be able to withstand the operating temperature of the glass furnace, typically 1500° C. This includes dimensional stability and/or shape stability.

Alternatively, the stirring body may be a solid object. In one example, a solid aluminum ellipsoid with major diameter of 1.0 m and minor diameter of 0.7 is used. In another example, an ellipsoid with diameters 0.5 m and 0.35 m is used. All sizes in this range are conceivable, as well as sizes 50% above and below.

In another aspect of the invention, there is provided a method of continuous operation of a glass furnace 100 with a melting tank 112 containing a glass melt 130. The glass furnace 100 may have the further characteristics shown in FIGS. 7 and 8 and described above, but this is not essential to the method. According to the method, batch material is fed into the glass melt, preferably at an upstream portion and preferably in a quasi-continuous fashion. The mixture of the glass melt and the added batch material is allowed to flow into a heated combustion chamber 110 (i.e., first portion of the melting tank 112). The mixture may be drawn into the combustion chamber 110 by convective flows and/or may be displaced in the downstream direction by the quasi-continuously added batch material. The method further comprises generating a time-varying magnetic field suitable for moving a stirring body 701, 702, 703 immersed in the glass melt 130.

The method may be implemented as a computer program to be executed by a computer, in particular a process controller configured to control the operation of the glass furnace as regards batch addition, heating and/or stirring. The computer program may be stored on a computer-readable medium.

To summarize, embodiments of the invention apply electromagnetic devices together with one or more immersed stirring bodies in a continuous glass melting tank to enhance flow circulation. The electromagnetic devices are mounted on (in particular beneath) the bottom of the glass melting tank. The immersed stirring bodies are placed in the glass melt to improve glass melt homogenization (without interfering with the glass properties themselves, such as chemical properties) and to provide efficient melt stirring. Embodiments furthermore provide a controllable electromagnetic power device to control and to adjust glass melt flow speed during melting process. The stirring enhances the heat transfer and accelerates the chemical reactions in the glass melt, wherein the stirring movement is achieved by Lorentz forces acting on the immersed stirring bodies. The electromagnetic stirring fields together with immersed stirring bodies, when applied and provided in a continuous float glass melting tank, may bring the following benefits:

reduced process time and enhanced productivity;
increased energy efficiency; and
improved furnace temperature homogenization and glass quality.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A magnetic stirring arrangement for a glass furnace with a melting tank for containing a glass melt, the magnetic stirring arrangement comprising:

an electrically conductive stirring body configured to be immersed in the glass melt for stirring the glass melt; and a magnetic actuator configured to generate a time-varying magnetic field suitable for moving the stirring body, wherein the stirring body has an ellipsoidal shape with a minor diameter of at least 0.175 m and major diameter of at least 0.25 m and a magnetic flux density of the magnetic field is at least 0.1 T where it reaches the stirring body.

2. The magnetic stirring arrangement of claim 1, wherein the magnetic actuator is to be arranged beneath a floor of the melting tank.

3. The magnetic stirring arrangement of claim 1, wherein the magnetic actuator is configured to generate a periodic magnetic field.

4. The magnetic stirring arrangement of claim 3, wherein the period of the magnetic field is between 1 and 10 s.

5. The magnetic stirring arrangement of claim 3, wherein the periodic magnetic field is a rotating magnetic field.

6. The magnetic stirring arrangement of claim 1, wherein the magnetic actuator is configured to retain the stirring body axially.

7. The magnetic stirring arrangement of claim 1, wherein the stirring body is shape-stable at 1500° C.

8. The magnetic stirring arrangement of claim 1, wherein a central portion of the stirring body is hollow, gas-filled, evacuated or made of a refractory material.

9. The magnetic stirring arrangement of claim 1, wherein the stirring body has a minor diameter of at most 1.05 m and major diameter of at most 1.5 m.

10. The magnetic stirring arrangement of claim 1, wherein the magnetic actuator is configured to rotate the stirring body at a peak surface velocity between 1 and 10 cm/s.

11. A glass furnace for continuous operation, comprising:
a melting tank for containing a glass melt;
an electrically conductive stirring body configured to be immersed in the glass melt for stirring the glass melt; and
a magnetic actuator configured to generate a time-varying magnetic field suitable for moving the stirring body immersed in the glass melt,
wherein the stirring body has an ellipsoidal shape with a minor diameter of at least 0.175 m and major diameter of at least 0.25 m and a magnetic flux density of the magnetic field is at least 0.1 T where it reaches the stirring body.

12. The glass furnace of claim 11, wherein the magnetic actuator is configured to generate a periodic magnetic field.

13. The glass furnace of claim 11, which comprises at least two magnetic actuators.

14. The glass furnace of claim 13, wherein different ones of the magnetic actuators are configured to generate magnetic fields with different time variations.

15. The glass furnace of claim 14, wherein at least two of the magnetic actuators are configured to generate oppositely rotating magnetic fields.

16. The glass furnace of claim 11, comprising the stirring body, wherein the stirring body is shape-stable at 1500° C.

17. The glass furnace of claim 11, wherein:
a first portion of the melting tank is located in a combustion chamber and a second portion of the melting tank is located in a feeder chamber; and
the magnetic actuator is arranged at the first portion of the melting tank.

18. The glass furnace of claim 17, further comprising a batch feeding arrangement upstream of the combustion chamber.

19. A method of continuous operation of a glass furnace with a melting tank containing a glass melt, the method comprising:
feeding batch material into the glass melt; and
allowing the glass melt with the batch material to flow into a heated combustion chamber,
generating a time-varying magnetic field suitable for moving a stirring body immersed in the glass melt to stir the glass melt, wherein the stirring body is electrically conductive,
wherein the stirring body has an ellipsoidal shape with a minor diameter of at least 0.175 m and major diameter of at least 0.25 m and a magnetic flux density of the magnetic field is at least 0.1 T where it reaches the stirring body.

20. The magnetic stirring arrangement of claim 1, wherein the magnetic actuator is an electromagnetic actuator.

21. The magnetic stirring arrangement of claim 20, wherein the magnetic actuator comprises at least one coil mounted on a magnetic yoke and configured to conduct current.

* * * * *